United States Patent Office 2,973,362
Patented Feb. 28, 1961

2,973,362
METHOD OF PREPARING MONOSUBSTITUTED PIPERAZINES

Gerald Schorsch, 200 East End Ave., New York, N.Y.

No Drawing. Filed July 24, 1959, Ser. No. 829,226

7 Claims. (Cl. 260—268)

The present invention relates to the preparation of monosubstituted piperazines such as monoacetyl piperazine and derivatives thereof.

The new monosubstituted piperazines and their derivatives are useful as antihistaminics and ataractics or as intermediates for compounds having such properties.

It is well known that when piperazine is reacted with other compounds, disubstituted reaction products form under normal reaction conditions. In the few instances in which monosubstituted products have heretofore been prepared, it has been essential to select and to control carefully the reaction conditions. In those instances also, there was generally obtained a mixture of monosubstituted and disubstituted reaction products with unreacted starting material from which the isolation of the monosubstituted product was difficult or practically impossible when the substituting group was relatively small.

The yield of monosubstituted product was usually under 50% of theory. One prior method involved the heating of piperazine and a lower alkyl formate in an autoclave. The yields were very variable and the reaction produced bis compounds along with monoformyl piperazine. Another prior method reacted piperazine with acetic anhydride in glacial acetic acid. The yield was only 40% based on the piperazine.

According to the present invention, monoacetyl piperazine and other monosubstituted piperazines can be economically prepared in good yield without the necessity of utilizing carefully controlled reaction conditions. By means of the invention, monoacetyl piperazine can be readily prepared by a simple method and the product used as such or for obtaining derivatives such as monomethyl or monobenzyl piperazine. The monsubstituted piperazines can also be used to prepare a variety of unsymmetrical disubstituted derivatives.

It has now been found that monoacetyl piperazine can be prepared by reacting piperazine with a stoichiometric amount of acetamide in an inert solvent such as xylene under reflux for several hours and in the presence of a catalytic amount of a halogen. The reaction temperature is determined by the boiling point of the solvent which, in the case of xylene, is 139° C. Ordinary atmospheric pressure conditions are employed so that no autoclaving or superatmospheric pressure need be used. The reaction is complete when evolution of ammonia gas has practically ceased, whereupon the solvent is distilled off and the distillation continued to remove unreacted piperazine in the boiling range of 140° C. to 155° C. The distillation is then further continued under vacuum to distill off the monoacetyl piperazine at 156° C. to 165° C. at 15 mm. pressure. The yield is in excess of 70% of theory.

The residue in the still consists of relatively minor amounts of diacetyl piperazine not exceeding about 10% to 15% of the piperazine starting material. This can be readily hydrolyzed to obtain piperazine for use in the next batch and hence does not constitute a loss.

The invention is illustrated by the following non-limitative example:

*Example*

86 parts of anhydrous piperazine and 59 parts of acetamide are refluxed in 150 parts of xylene containing 1 part of metallic iodine. After refluxing for about 8 hours, the evolution of ammonia gas ceases and the xylene is distilled off. The distillation is then continued until all unreacted piperazine is collected in the boiling range of 140° C. to 155° C. distilling vapor temperature. 15 parts of piperazine were thus obtained. The distillation is then continued under a vacuum of 15 mm. Hg whereupon 91 parts of monoacetyl piperazine are obtained and collected at 1560 C. to 165° C., corresponding to a yield of 71%. The still residue of 17 parts of diacetyl piperazine or 10% of the starting quantity of piperazine is hydrolyzed to recover piperazine for re-use in the next batch.

It has further been discovered according to the invention that the reaction is selective and critical as it only operates when using piperazine and acetamide. Trials of even closely related reactants failed to give satisfactory results or any useful results at all insofar as the present invention is concerned.

The product monoacetyl piperazine forms very hygroscopic crystals of M. Pt. 52° C. after several recrystallizations from alcohol. It forms a hydrochloride salt of M. Pt. 183° C., a tartrate of M. Pt. 159–161° C. and an adipate of M. Pt. 161–162° C.

What is claimed is:

1. The method which comprises refluxing stoichiometric amounts of piperazine and acetamide in an inert solvent containing a catalytic amount of a halogen and recovering the monoacetylpiperazine thus produced by vacuum distillation at 156 to 165° C.

2. The method of claim 1, in which the reaction is carried out at the temperature of reflux of the solvent.

3. The method of claim 1, in which the solvent is xylene.

4. The method of claim 1, in which the halogen is iodine.

5. The method which comprises refluxing anhydrous piperazine and acetamide in the relative proportions of 86 parts of piperazine and 59 parts of acetamide in 150 parts of xylene containing 1 part of metallic iodine until evolution of ammonia ceases and recovering monoacetylpiperazine by fractional distillation.

6. The method of preparing monoacetyl piperazine which comprises refluxing anhydrous piperazine and acetamide in the relative proportions of 86 parts of piperazine and 59 parts of acetamide in 150 parts of xylene containing 1 part of metallic iodine until evolution of ammonia ceases and the xylene is distilled off, continuing distillation to collect unreacted piperazine in the boiling range of 140 to 155° C., and further continuing the distillation at a pressure of 15 mm. of Hg to obtain the monoacetyl piperazine at 156 to 165° C. in a yield of at least about 70%.

7. The method of preparing monoacetyl piperazine which comprises refluxing anhydrous piperazine and acetamide in the relative proportions of 86 parts of piperazine and 59 parts of acetamide in 150 parts of xylene containing 1 part of metallic iodine until evolution of ammonia ceases and the xylene is distilled off, continuing distillation to collect unreacted piperazine in the boiling range of 140 to 155° C., and further continuing the distillation at a pressure of 15 mm. of Hg to obtain the monoacetyl piperazine at 156 to 165° C. in a yield of at least about 70%, the still residue of diacetyl piperazine being hydrolyzed to piperazine for re-use.

References Cited in the file of this patent
FOREIGN PATENTS 497,485     Great Britain _____ June 17, 1938

OTHER REFERENCES

Chemical Abstracts, vol. 34, pages 7845–7846 (1940).
Galat et al.: Jour. Amer. Chem. Soc., vol. 65, pages 1566–1567 (1943).